United States Patent [19]

Nakamura

[11] Patent Number: 4,939,750

[45] Date of Patent: Jul. 3, 1990

[54] ADAPTIVE SIGNAL DISCRIMINATION CIRCUIT AND A METHOD FOR DISCRIMINATING HIGH AND LOW LEVEL OF DATA SIGNALS

[75] Inventor: Seizo Nakamura, Tokyo, Japan

[73] Assignee: Oki Electric Industry, Co., Ltd., Tokyo, Japan

[21] Appl. No.: 323,382

[22] Filed: Mar. 14, 1989

[30] Foreign Application Priority Data

Mar. 17, 1988 [JP] Japan .................................. 63-61915
Mar. 17, 1988 [JP] Japan .................................. 63-61914

[51] Int. Cl.$^5$ ............................................. H04L 25/06
[52] U.S. Cl. ...................................... 375/76; 307/359
[58] Field of Search ....................... 375/4, 76; 358/282; 307/354, 358, 359; 328/146

[56] References Cited

U.S. PATENT DOCUMENTS 4,542,304 9/1985 Swanson .............................. 307/359
4,585,989 4/1986 Matney ................................ 307/359
4,754,477 6/1988 Tanaka et al. ....................... 307/359

Primary Examiner—Benedict V. Safourek
Attorney, Agent, or Firm—Spencer & Frank

[57] ABSTRACT

An apparatus and a method for adaptively discriminating high and low levels of data signals to be demodulated into digital signals, which includes a reference signal generator, first and second sample and hold circuits, a discrimination signal generator, a timing signal generator and a discriminator. The first sample and hold circuit samples data signals at first discrete times at which the discriminator detects a high level of the data signal in relation to a discrimination level, and outputs a first sample signal whose level depends upon the level of the data signals at the first discrete times. Similarly, the second sample and hold circuit samples a low level of the data signals and outputs a second sample signal whose level depends upon the level of the data signals at the second discrete times. The apparatus further includes a signal generator which generates an average of an absolute value of the levels of the sample signal first and that of the second sample signal and a further signal generator which generates an inversion of the average signal. An additional signal generator has a low-pass filter and selector to selectively apply one of the average and inversion signals to the low-pass filter. The selector applies the inversion signal when the discriminator detects that the high level of the data signals has been inputted, otherwise, it applies the average signal. The output of the low-pass filter is a reference signal formed of a composite of the inversion and average signals. The reference signal is applied to the discrimination signal generator which produces the discrimination level so as to adjust the level of the discrimination level in proportion to the level reference signal.

40 Claims, 5 Drawing Sheets

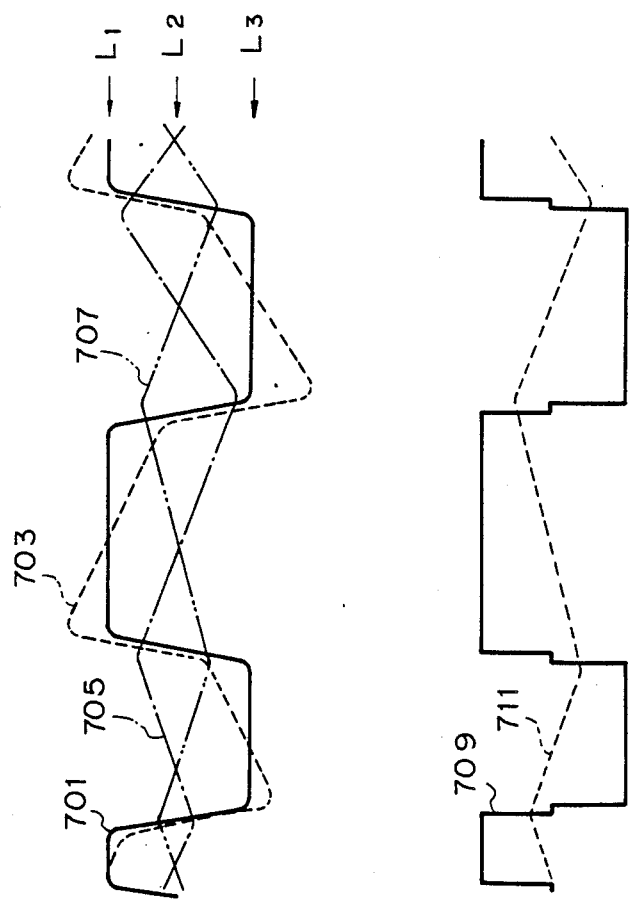

ADAPTIVE SIGNAL DISCRIMINATION CIRCUIT AND A METHOD FOR DISCRIMINATING HIGH AND LOW LEVEL OF DATA SIGNALS

BACKGROUND OF THE INVENTION

The present invention relates to an electrical circuit and method for generating an adaptive discriminating voltage used for demodulation of data signals into digital signals at a receiving side, and particularly for generating such a voltage used for demodulation of data signals of which relatively low frequencies are cut off during modulation, transmission or reception thereof.

The transmission of digital signals in a radio transmission line or channel has lately attracted considerable attention. There have been many different ways of modulating digital signals into data signals adapted for a radio transmission. In a mobile radio transmission system which transmits data signals through individual channels each, respectively assigned to a corresponding carrier wave this is, which may be called "single channel per carrier wave transmission", there are, for example, a modulation method for directly modulating binary digital signals into frequency modulation (FM) data signals and a modulation method for modulating data signals, for example, digital signals attenuated by a low-pass filter such as a gaussian filter, into FM data signals. The latter modulation method is called "Gaussian Filter Manipulated Minimum Shift Keying" (GMSK) modulation and requires a relatively narrower transmission band. There is also a method for modulating data signals obtained from binary digital signal and having tetrad levels into FM data signals.

In the above mentioned system, because of the presence of direct current (D.C.) cut-off circuits, it is difficult to faithfully transmit the D.C. or low frequency components of such FM data signals. As a consequence, owing to the variation of center voltage of the data signals at a receiving side, it is also difficult to faithfully demodulate such data signals into digital signals without the D.C. components of the data signals. In order to improve such faithfulness, Yoshiki HIGO et al., in "Considerations on Quantized Feedback DC Restoration for a High Speed Digital Repeater", Report of Technical group, CS Vol. 75 No. 2, P 93-94, Institution of Electric and Communication Engineers of Japan (July 24, 1975), has proposed an approach that reproduces D.C. components of data signals at a receiving side. The above approach, however, requires a special automatic gain control circuit at the receiving side which can linearly control the amplitude of the received data signals. Such a circuit is requested because a demodulator according to this approach operates effectively only on condition that the amplitude of demodulated digital signals is identical to that of the received digital signals. As a result, this approach also causes a complication in the design of the demodulator and, further, can not be applied to the system of demodulating data signals composed of more that two levels.

SUMMARY OF THE INVENTION

Accordingly, it is an object of the present invention to provide an improved apparatus and method to generate an adaptive discrimination signal for use in to conducting a faithful demodulation of data signals into digital signals.

It is another object of the present invention to provide an improved circuit apparatus and method to be easily able to generate two or more discrimination signals so as to demodulate data signals having two or more levels.

It is further another object of the present invention to provide an improved apparatus and method to generate reference signal of which variation of its value are subject to that of received data signals at a receiving side. The discrimination signals, generated by this apparatus and method of the invention, which may be voltages depend upon such reference signal and, as the result, can be adaptive to the variation of the received data signals.

It is still a further object to provide an improved apparatus and method to generate a variable compensation signal to compensate for variations in received data signals at the receiving side. Therefore, the compensated data signals, whose level is the sum of that of a the received data signals and the compensation signal, has D.C. components reintroduced after having been cut off during the transmission and reception of the data signals. The discrimination signals generated by such an apparatus and method can therefore adapt to the variation of the received data signals.

An apparatus of a first embodiment of the invention, in order to generate an adaptive discrimination signals for use in demodulating data signals which vary between high and low levels, into digital signals, includes a reference signal generating means input means for receiving the data signals, first and second sample and hold means for sampling and holding the data signals, discrimination signal generating means for adaptably generating discrimination levels timing signal generating means and discriminating means for discriminating between high and low levels of data signals using the generated discrimination levels. The first sample and hold means samples the data signals from the input means at first discrete times at which the discriminating means detects a high level of the data signals in relation to a discrimination level, and output a first sample voltage indicative of the level of the data signals at the first discrete times. Similarly, the second sample and hold means samples relatively low level of the data signals and outputs a second sample signal indicative of the voltage of the data signals at every second discrete times. Another signal generating means which generates an average signals indicate of an absolute voiue of the first sample voltage and that of the second sample signal and a further signal generator generates an inversion signal which is an inversion of the average signals. A reference signal generating means of this apparatus has a low-pass filter and means for selectively applying one of the average signal and the inversion signal to the low-pass filter. The applying means apply the inversion signal when the discriminating means detects that the high level of the data signals has been input, otherwise, it applies the average signal. The low-pass filter outputs the reference signals as a composite of the inversion and average signals to the discrimination signal generating means in order to adjust the desrimination level. Therefore, since the variation of the reference level is subject to the variation of the data signals, and the discrimination level is adaptive to the reference level the discrimination level is adaptive to the variation of the data signals.

In accordance with another aspect of the invention, the discrimination signal generating means generates first and second discrimination signal, typically voltages. The levels of the first discrimination signals is intermediate, preferably at the midpoint, of the first and reference signal levels, while the second discrimination signal level is intermediate, preferably at the midpoint of the reference and second signal levels. The discriminating means detects an intermediate level of the data signals by usage of such first and second discrimination signal. The intermediate level is intermediate of the levels of the first and second discrimination voltages, while the high level is above the first discrimination level, and the low level is below the second discrimination level. The applying means can apply ground potential to the input terminal of said low-pass filter when said discriminating means detects the intermediate level voltage. As a consequence, the variation of the reference level follows the variation of the data signals.

In accordance with a further aspect of the invention, if the data signals vary in accordance with a predetermined eye-pattern having eye opening portions at third discrete times, the timing signal generating means can include means for comparing the levels of the data signals with the reference level and produce, in accordance with the result of comparison, the timing signals so as to coincide with the third discrete times of the eye opening portion. Thereby, the discriminating means can effectively perform a discrimination between the levels of the data signals.

In accordance with another embodiment of the invention, the input means has a summing means which adds to the received data signals, a compensation signal output from a compensation signal generating means, which is the inverse of the reference signal output by the reference signal generating means of the first embodiment, as an alternative to applying the reference voltage to the discriminating means. The summing means thus produces compensated data signals corresponding to the data signals added the compensation signals. Therefore, the compensated data signals can have the reproduced D.C. components which have been cut-off during the transmission and reception thereof because the variation of the compensation signal level is opposite to the variation of the data signals. As the result, the discrimination levels produced from the compensated data signals are adaptive to the variation of the data signals. Thereby, the discriminating means can also effectively perform the discrimination of levels of the data signals.

In accordance with a still further aspect of the invention, there is provided on adaptive discrimination signal generating method which can be performed by the foregoing respective apparatus.

As with the known approach of reproducing the D.C. components presented by the aforementioned paper, "Considerations on Quantized Feedback DC Restoration for High Speed Digital Repeater", the demodulator of this approach applies the digital data from its output terminal to the input terminal thereof through a quantizer. Thus, this approach requires the special automatic gain control circuit in order that the amplitude of the received data signals is identical to that of the digital signals.

Contrary to this, a demodulator of the invention does not require such an automatic gain control circuit because feedback signals, that is, the reference signals and compensation signals, are obtained from the received data signals and their amplitude is substantially identical to that of the received data signals.

BRIEF DESCRIPTION OF THE DRAWINGS

These and other features and advantages of the invention will be more completely understood from the following detailed description of the preferred embodiments with reference to the accompanying drawings in which:

FIGS. 7A and 7B are diagrams of waveforms applied to or generated from the circuit of the second embodiment shown in FIG. 5.

DESCRIPTION OF THE PREFERRED EMBODIMENTS

Figure 1:
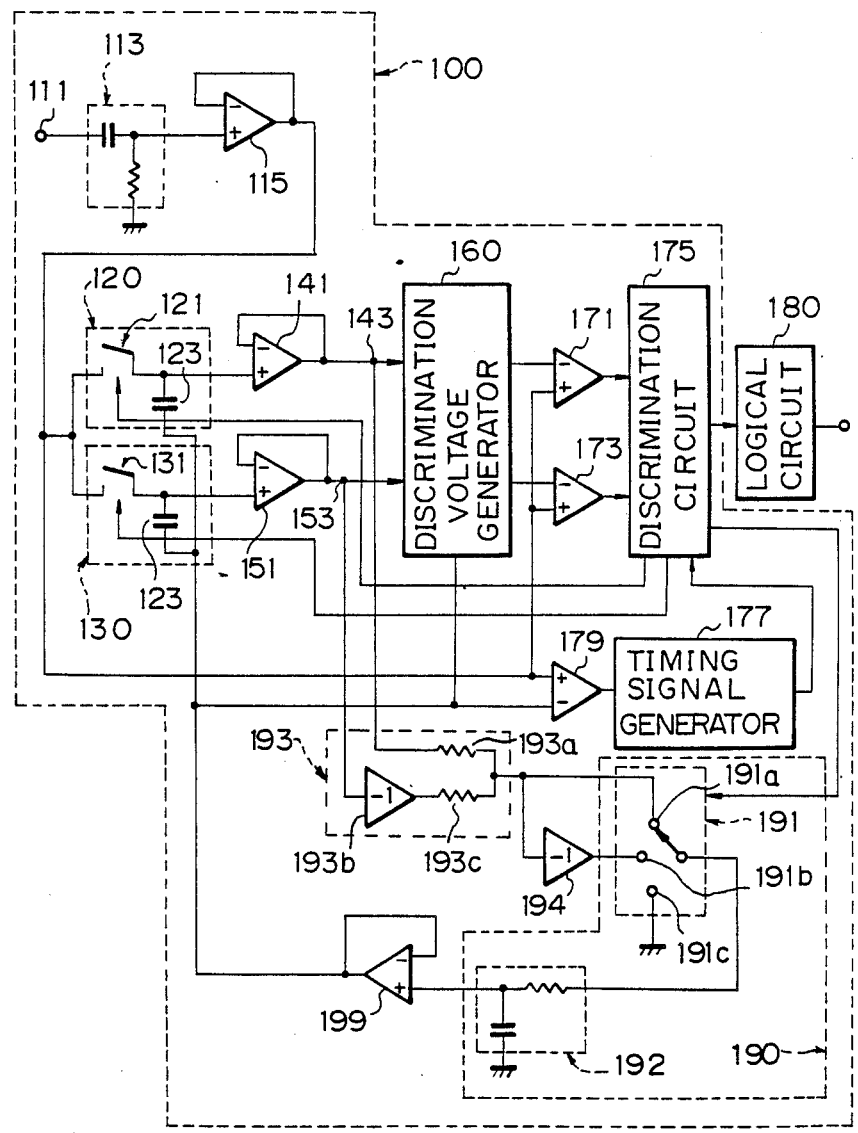
FIG. 1 is a block diagram of a first embodiment in accordance with the present invention.

There is illustrated in FIG. 1 a block diagram of a first embodiment, that is, an adaptive diacrimination voltage generator 100 according to the present invention.

An input terminal 111 of the adaptive discrimination voltage generator 100 is provided to receive data signals produced at a transmitting side by modulating digital signals and transmitting the same to the input terminal 111 through a conventional transmission line or channel (not shown). The data signals vary between high and low level voltages according to the digital signals generated at the transmitting side and are applied to first and second sample and hold circuits 120 and 130 through a high-pass filter 113 (comprised of a capacitor and a resistor) and a conventional voltage follower operational amplifier 115.

The high-pass filter 113 has a cut-off frequency preselected to be higher than the cut-off frequency of the transmission line and therefore attenuates low frequency components of the inputted data signals and passes high frequency components of the inputted data signals in relation to the preselected cut-off frequency thereof, and, thereby the deterioration of the data signal during the transmission can be ignored.

The first sample and hold circuit 120 is comprised of a first switch 121 and a first capacitor 123 and the second sample hold circuit 130 is comprised of a second switch 131 and a second capacitor 133. One terminal of the first and second capacitors 123 and 133 each is connected with the corresponding output terminal of the first and second switches 121 and 131, and the other terminals of the capacitors have commonly applied thereto a reference voltage from a reference voltage generator 190 (described in detail below) through a conventional voltage follower operational amplifier 199. The first and second switches 121 and 131 will of course have some resistance, and will close their circuits upon receiving a sampling pulse from a discrimination circuit 175 so as to sample a relatively high level voltage of the data signals by the first switch 121 and low level voltage of the data signals by the second switch 131. As a result, the first capacitor 123 is charged and holds a first difference voltage mainly depending upon the difference between the sampled high voltage and the reference voltage at the time of receiving a sampling pulse thereto and, similarly, the second capacitor 133 is charged and holds a second difference voltage mainly depending upon the difference between the sampled low voltage and the reference voltage at the time of receiving a sampling pulse thereto. The first and second difference voltages are successively renewed every time a sampling pulse is received at their respective switches 121 and 131. More precisely, according to the respective resistances and capacitances of the first and second sample and hold circuits 120 and 130, the value of the first difference voltage immediately upon being renewed is intermediate of the value of the first difference voltage just prior to being renewed and a value equal to the difference between the sampled high level voltage of the data signal and the reference voltage at the time of the first difference voltage being renewed and, similarly, the value of the second difference voltage immediately upon being renewed is intermediate of the value of the second difference voltage just prior to being renewed and a value equal to the difference between the voltage of the data signal and the reference voltage at the time of the second difference voltage being renewed. The first and second sample and hold circuits 120 and 130 respectively apply a first output voltage (first sample voltage), which is the first difference voltage superposed on the reference voltage, i.e., the sum of the first difference voltage and the reference voltage, and a second output voltage (second sample voltage), which is the second difference voltage superposed on the reference voltage, to a discrimination voltage generator 160 through respective voltage follower operational amplifiers 141 and 151 and connecting points 143 and 153.

The discrimination voltage generator 160 applies first and second discrimination voltages to respective analogue compnarators 171 and 173. The first discrimination voltage is intermediate of the first output voltage from the first sample and hold circuit 120 and the reference voltage from the reference voltage generator 190, preferably, the mid-point of the first output and reference voltage, while the second discriminating voltage is intermediate of the second output voltage from the second sample and hold circuit 130 and the reference voltage, preferably, the mid-point of the second output and reference voltage. The discrimination voltage generator 160 can, therefore, generate the respective first and second discrimination voltages adaptive to the first and second output voltages and the reference voltage.

Figure 2:
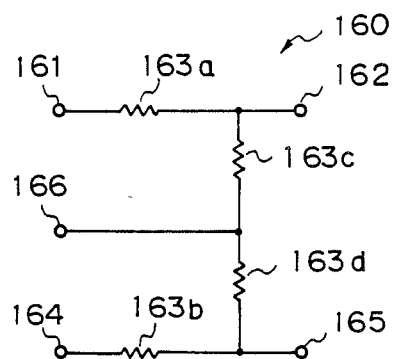
FIG. 2 is a circuit diagram of a discrimination voltage generator which can be employed in the first embodiment shown in FIG. 1.

Referring to FIG. 2 which is a circuit diagram of discrimination voltage generator 160, it includes a first input terminal 161 to which is applied the first output voltage and which is connected to a first output terminal 162 through a first resistor 163a, and a second input terminal 164 to which is applied the second output voltage and which is connected to a second output terminal 165 through a second resistor 163b. The first and second output terminals 162 and 165 are connected to a reference terminal 166 (to which the reference voltage is applied), through respective third and fourth resistors 163c and 163d. As a consequence, the discrimination voltage generator 160 may generate the first discrimination voltage, which is the mid-point between the first output voltage and the reference voltage at terminal 162, and generate the second discrimination voltage which is the mid-point between the reference voltage and the second output voltage, provided that all of the resistors 163a, 163b, 163c and 163d have an identical resistance value.

Referring again to FIG. 1, a first comparator 171 has a negative input terminal which receives the first discrimination voltage and a positive input terminal which receives the data signals from the input terminal 111 through the high-pass filter 113 and operational amplifier 115, and compares the voltage value of the data signals with the first disrimination voltage. The first comparator 171 output first digital signals designating "1" into the discrimination circuit 175 when the voltage value of the data signals is higher than the first discrimination voltage; otherwise the first comparator outputs second digital signals designating "0" into the discrimination circuit 175. Similarly, the second comparator 173 has a negative input terminal which receives the second discrimination voltage and positive input terminal which receives the data signals from the input terminal 111 through the high-pass filter 113 and operational amplifier 115, and compares the voltage value of the data signals with the second discrimination voltage. The second comparator 173 also outputs first digital signals designating "1" into the discrimination circuit 175 when the voltage value of the data signals is higher than the second discrimination voltage; otherwise the first comparator outputs second digital signals designating "0" into the disrimination circuit 175.

The discrimination circuit 175 discriminates among the high, intermediate and low level voltages of the data signals each time it receives a timing signal from a timing signal generator 177. The discrimination circuit 175 output first detection signals, designating that the high level voltage has been detected, second detection signals designating that the intermediate level voltage has been detected, and third detection signals designating that the low level voltage has been detected, in the manner disclosed in the following table.

TABLE

| DIGITAL SIGNAL INPUT FROM THE FIRST COMPARATOR | DIGITAL SIGNAL INPUT FROM THE SECOND COMPARATOR | OUTPUT OF THE DISCRIMINATION CIRCUIT |
|---|---|---|
| FIRST DIGITAL SIGNALS = "1" | FIRST DIGITAL SIGNALS = "1" | FIRST DETECTION SIGNALS (HIGH LEVEL VOLTAGE) |
| SECOND DIGITAL SIGNALS = "0" | FIRST DIGITAL SIGNALS = "1" | SECOND DETECTION SIGNALS (INTERMEDIATE LEVEL VOLTAGE) |
| SECOND DIGITAL SIGNALS = "0" | SECOND DIGITAL SIGNALS = "0" | THIRD DETECTION SIGNALS (LOW |

| TABLE-continued | | |
|---|---|---|
| DIGITAL SIGNAL INPUT FROM THE FIRST COMPARATOR | DIGITAL SIGNAL INPUT FROM THE SECOND COMPARATOR | OUTPUT OF THE DISCRIMINATION CIRCUIT (LEVEL VOLTAGE) |

As shown in the above table, a first detection signals is output from the discrimination circuit 175 upon simultaneously receiving both a first digital signal from the first comparator 171 and a first digital signal from the second comparator 173. Similarly, a second detection signal is output upon simultaneously receiving both a second digital signal from the first comparator 171 and a first digital signal from the second comparator 173, and a third detection signal is output upon simultaneously receiving both a second disital signal from a first comparator 171 and a second digital signal from the second comparator 173.

The timing signal generator 177 receives successive digital signals composed of "1"'s and "0"'s from a third comparator 179, whose negative input terminal receives the reference voltage from the reference voltage generator 190 through the operational amplifier 199, and whose positive input terminal receives the voltage of the data signals from the input terminal 111 through the high-pass filter 113 and the operational amplifier 115. The third comparator 179 repeatedly outputs the digital signal "1" as long as the voltage value of the data signals is higher than the reference voltage; and otherwise outputs the digital signal "0".

Figure 3A:
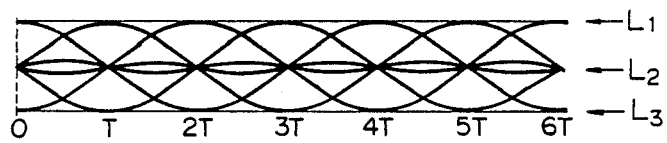
FIG. 3A is a graph of eye-pattern of data signals having eye-open portions at discrete time.
Figure 3B:
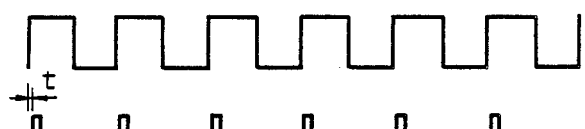
FIG. 3B is a graph of clock signals which are synchronized with the eye-open portions shown in FIG. 3A
Figure 3C:
FIG. 3C is a graph of sampling pulses for sampling in the sample and hold, circuits.

Now, if it is assumed that Gaussian Minimum Shift Keying (GMSK) data signals are transmitted from the transmitting side and have a ratio Bb·T=0.25, wherein Bb is the bandwidth of a gaussian filter used at the time of modulation and T is the inverse of the bit rate of the digital data transmission, the GMSK signals have an eye-pattern such as in the diagram shown in FIG. 3A. The eye-pattern has eye opening (peak) portions at every T seconds where the voltage level of the data signals substantially reach one of the high (L1), middle (L2) and low (L3) voltage levels. (where T. is again the inverse of the bit rate) the timing signal generator 177 generates clock signals as shown in FIG. 3B which are substantially synchronized with the digital signals from the third comparator 179. The timing signals from the timing signals generator 177 coincide with the rise times of the clock signals and substantially with the times of the presence of the eye-open (peak) portions as seen in FIG. 3A and 3B. As a consequence, the discrimination circuit 175, in response to the timing signals, can effectively discriminate among the high, intermediate and low level voltages of the data signals because the levels of received data signals at the receiving side should be also adjacently present at one of the high, intermediate and low level voltages. The timing signal generator 177 also generates a sampling pulse at certain internal of time (t) after each timing signal is generated, as shown in FIG. 3C, wherein the time interval (t) is set so as to substantially coincide with the time at which discrimination among the high, intermediate and low level voltages is completed by the discriminating circuit 175. The discrimination circuit 175 selectively applies a sampling pulse to the first switch 121 upon outputting by the generator 160 of a first detection signal i.e. detecting a high level voltage, or to the second switch 131 upon outputting by generator 160 of a third detection signal i.e. detecting a low level voltage. The discrimination circuit 175 applies the sampling pulse to neither the first or second switches upon outputting by the generator 160 of a second detection signal i.e. detecting the intermediate level voltage.

A logical circuit 180 received the first, second and third detection signals from the discrimination circuit 175 and successively outputs either a first digital logic signal designating "1" or a second digital logic signal designating "0". The logical circuit 180 generates the first logic signal upon receiving the first detection signal and the second logic signal upon receiving the third detection signal. The logical circuit 180, at the time of receiving the second detection signal, generates either the first or second logic signal in accordance with a judgement thereof depending upon the trend establish by the previous logic signal output therefrom. The judgement of the logical circuit 180 can be achieved by a conventional logical circuit.

The reference voltage generating means 190 has a quantization level selection circuit 191 (hereinafter referred to as "the selection circuit") and a low-pass filter 192, and receives the first, second and third detection signals from the discrimination circuit 175. The selection circuit 191 has first, second and third selection terminal 191a, 191b and 191c. The first selection terminal 191a is connected with an output terminal of an average voltage output circuit 193 having two input terminals, two equal resistance valued resistors 193a and 193c and an inversion amplifier (gain of-1). One of the two input terminals is connected to the first connecting point 143 and to the output terminal through the first resistor 193a, and the other input terminal is connected to the second connecting point 153, and to the output terminal through an inversion amplifier 193b, and the second resistor 193. As a consequence, the average voltage output circuit 193 can output an average voltage substantially corresponding to an average of an absolute value of the output voltage from the first sample and hold circuit 120 and an absolute value the output voltage from the second sample and hold circuit 130. The first selection terminal 191a receives the average voltage from the average voltage output circuit 193, while the second selection terminal 191b is also connected to the average voltage output circuit 193 through an inversion amplifier 194 (having a gain of −1) and receives an voltage (an "inversion voltage") equal to the inversion of the average voltage, and the third selection terminal 191c is grounded.

The selection circuit 191, in response to the output of the discrimination circuit 175, selectively applies one of the average voltage, the inversion voltage and the ground potential, as a quantized voltage to the input terminal of the low-pass filter 192. The average voltage from the first selection terminal 191a is applied to the low-pass filter 192 upon receiving the third detection signal from the discrimination circuit 175 at the selection circuit 191. Similarly, the inversion voltage from the second selection terminal 191b is applied upon receiving the first detection signal, while the ground potential is applied upon receiving the second detection signal.

The low-pass filter 192 successively receives one of the queantized voltages from the selection circuit 191 and outputs the reference voltage trough a conventional voltage follower operational amplifier 199. The cut-off frequency to the low-pass filter 192 is set so as to be identical to the preselected cut-off frequency of the high-pass filter 113.

Figures 4A, 4B:
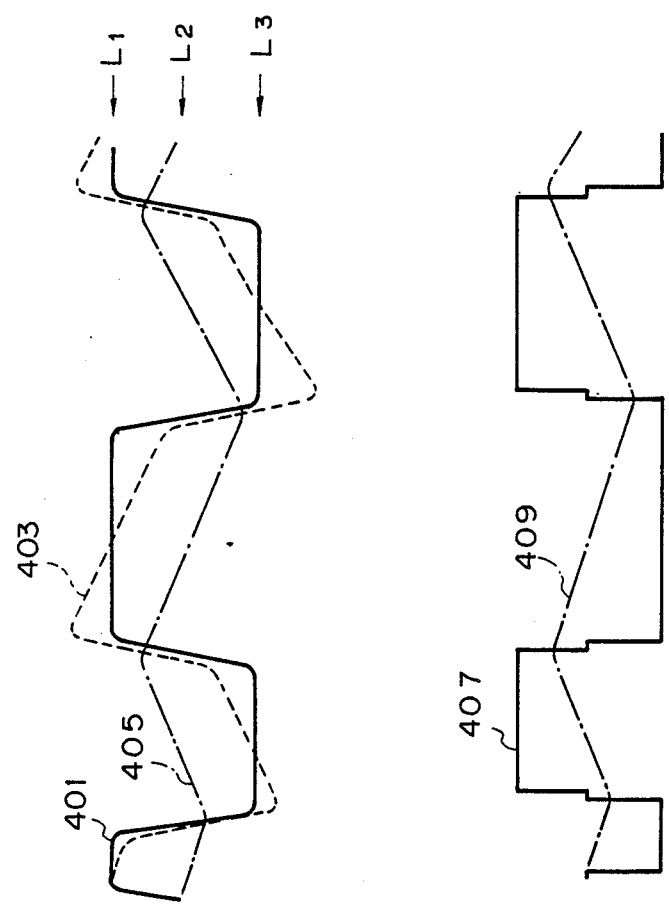
FIGS. 4A and 4B are diagrams of waveforms applied to or generated from the circuit of the embodiment shown in FIG. 1.

Referring to FIGS. 4A and 4B there are illustrated examplary waveforms passing through the digital radio transmission system according to the present invention. FIG. 4A shows a first waveform 401 of the data signals which vary among high(L1), intermediate (L2) and low (L3) level voltages, at the transmitting side of the system. A second waveform 403 of the received data signals, outputted from the high-pass filter 113 at receiving side is also shown in FIG. 4A. The D.C. components of the first waveform 401 is cut off by the transmission line and mainly the high-pass filter 113 and this waveform is therefore changed the second waveform 403 or the like. A third waveform 405 in FIG. 4A merely represents the variation of the center level of the output of the high-pass filter 113. A fourth waveform 407 shown in FIG. 4B, represents the outputs of the selection circuit 191 which vary among the average voltage, ground potential and the inversion of the average voltage. A fifth waveform 409 represents the reference voltage output from the low-pass filter 192.

As seen in FIG. 4A and 4B, the variation of the fifth waveform 409 follows that of the third waveform 405, i.e., the variation of the center level of the output of the high-pass filter 113. The discrimination voltage generator 10 can therefore generate the first and second discrimination signals which are respectively adaptive to the variation of the received data signal at the receiving side because both of the first and second discrimination voltages respectively follow the fifth waveform 405, i.e., the variation of the reference voltage.

Figure 5:
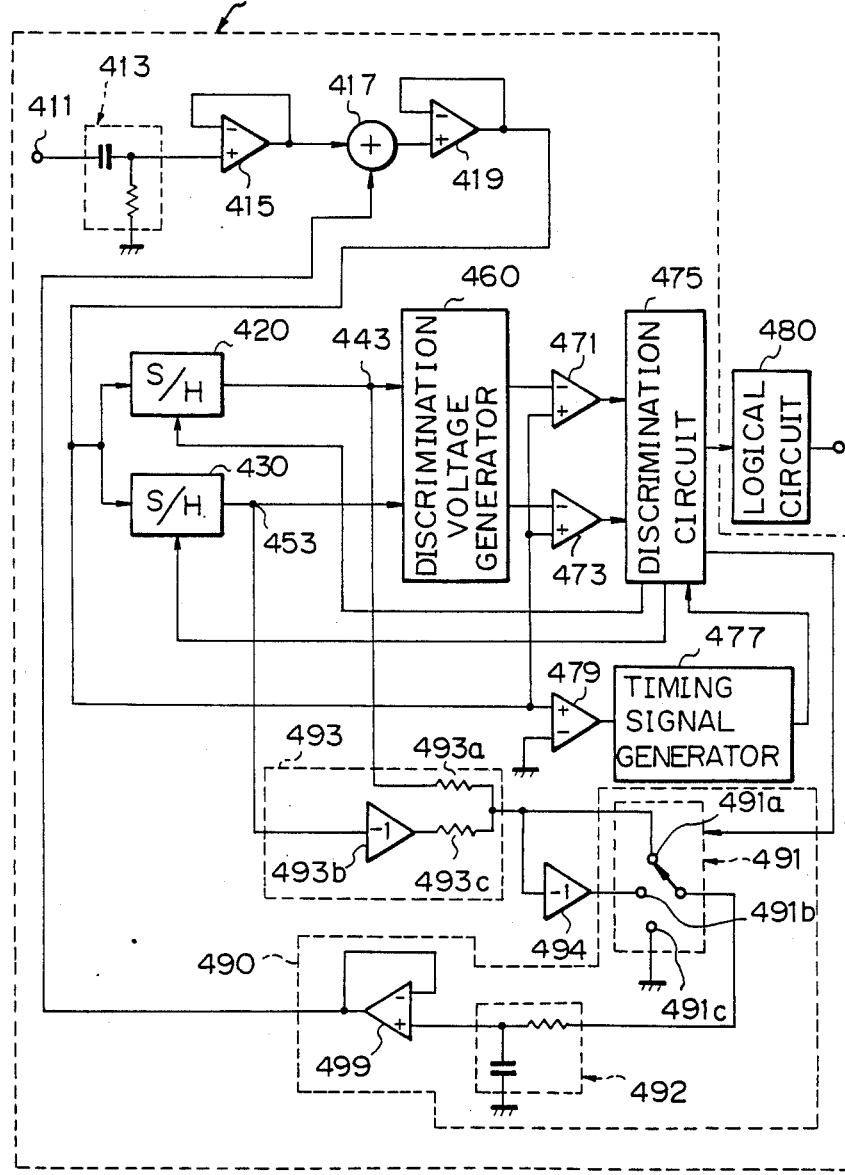
FIG. 5 is a block diagram of a second embodiment in accordance with the present invention.

Referring now the FIG. 5 there is shown a block diagram of a second embodiment of an adaptive discrimination voltage generator according to the present invention.

The adaptive discrimination voltage generator 400 shown in FIG. 5 has an input terminal 411 which receives data signals in the form of modulated digital signals from a transmitting side, through a conventional transmission line (not shown). The received data signals vary between high and low level voltages according to the digital signals generated at the transmitting side and are applied to a summing circuit 417 through a high pass filter 413 and an operational amplifier 415. The high-pass filter 413 has a preselected cut-off frequency substantially the same as the high-pass filter 113 in the embodiment of FIG. 1.

Alse applied to the summing circuit 417 is a compensation voltage generated from the compensation voltage generator 490 described in detail below. The summing circuit 417 outputs compensated data signals, substantially corresponding to the sum of the voltage of the received data signals and the compensation voltage and applied the compensated data signals to first and second sample and hold circuits 420 and 430 through an operational amplifier 419.

The first and second sample and hold circuit 420 and 430 can respectively have the form of the first and second sample and hold circuits 120 and 130 in the embodiment of FIG. 1, provided that one of the terminals of each of the first and second capacitors 123 and 133 is grounded (rather than being coupled to a reference voltage). The first and second sample and hold circuits 420 and 430 respectively sample the compensated data signals upon respectively receiving a discrete sampling pulse from a discrimination circuit 475 and respectively hold the voltage of the compensated data signals at the time of receiving the sample pulse with respect to the ground potential. The first and second sample and hold circuits 420 and 430 respectively apply a first output voltage (first sample voltage), held in the circuit 420 and a second output voltage (second sample voltage) held in the circuit 430, to a discrimination voltage generator 460 through respective connecting points 443 and 453.

The discrimination voltage generator 460 applies respective first and second discrimination voltage to respective analoge comparators 471 and 473. The first discrimination voltage is intermediate of the first output voltage from the first sample and hold circuit 420 and the ground potential, preferably, the mid-point of the first output voltage and ground potential. The second discrimination voltage is intermediate of the second output voltage from the second sample and hold circuit 430 and the ground potential, preferably, the mid-point of the second output voltage and ground potential. The discrimination voltage generator can, therefore, generate the respective first and second discrimination voltages adaptive to the output voltages of the respective sample and hold circuits 420 and 430.

Figure 6:
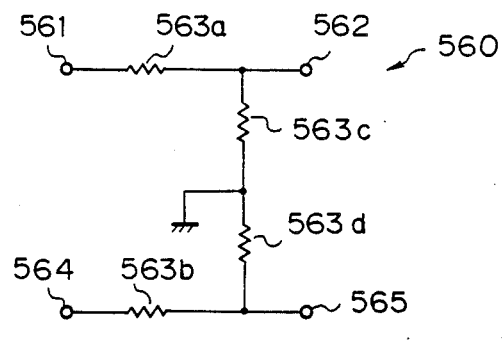
FIG. 6 is a circuit diagram of a discrimination voltage generator which can be employed in the second embodiment shown in FIG. 5.

Referring to FIG. 6, there is an examplary embodiment of the illustrated discrimination voltage generator 460 which is similar to the discrimination voltage generator 160 of the previously described embodiment illustrated in FIG. 2. Discrimination voltage generator 460 includes a first input terminal 461 to which is applied the first output voltage from sample and hold circuit 420 and which, is connected to a first output terminal 462 thereof through a first resistor 463a, and a second input terminal 464, to which is applied the second output voltage and which is connected to a second output terminal 465 through a second resistor 463b. The first and second output terminals 462 and 465 are respectively grounded through respective third and fourth resistors 463c and 463d. As a consequence, the discrimination voltage generator 460 may generate the first discrimination voltage which is the mid-point between the first output voltage and ground potential and the second output voltage, provided that all of the resistors 463a, 463b, 463c and 463d have an identical resistance value.

Referring again to FIG. 5, a first comparator 471 has a negative input terminal which receives the first discrimination voltage and a positive input terminal which receives the compensated data signals from the summing circuit 417 through the operational amplifier 419, and compares the voltage volue of the compensated data signals with the first discrimination voltage. The first comparator 471 outputs first digital signals designating "1" into the discrimination circuits 475 when the voltage value of the compensated data signals is higher than the first discrimination voltage, otherwise the first comparator 471 outputs second digital signals designating "0" into the discrimination circuit 475. Similarly, the second comparator 473 has a negative input terminal which receives the second discrimination voltage and a positive input terminal which receives the compensated data signals from the summing circuit 417 through the operational amplifier 419, and compare the voltage value of the compensated data signals with the second discrimination voltage. The second comparator 473 also outputs first digital signals designating "1" into the discrimination circuit 475 when the voltage value of the compensated data signals is higher than the second discrimination voltage, otherwise the first comparator outputs second digital signals designating "0" into the discrimination circuit 475.

The discrimination circuit 475 discriminates among the high, intermediate and low level voltages of the compensated data signals each time it receives a timing signals from a timing signal generator 477. The discrimination circuit 475 outputs first detection signals designating that the high level voltage has been detected, second detection signals designating that the intermediate level voltage has been detected, and third detection signals, designating that the low level voltage has been detected, in the same manner as disclosed above with respect to the discrimination circuit 175 in the embodiment of FIG. 1 and the foregoing table.

The timing signal generator 477 receives successive digital signals composed of the "1"'s and "0"'s from a third comparator 479 whose negative input terminal is grounded and whose positive input terminal receives the voltage of the compensated data signals from the summing circuit 417 through the operational amplifier 419. The third comparator 479 repeatedly outputs the digital signals "1" as long as the voltage value of the compensated data signals is higher than the ground potential, and otherwise, outputs the digital signals "0".

Now, if it is assumed that Gaussian Minimum Shift Keying (GMSK) data signals are transmitted from the transmitting side and have a ratio Bb·T=0.25, wherein Bb is the bandwidth of a gaussian filter used at the time of modulation and T is the inverse of the bit rate of the digital data transmission, then as had already explained in the above with respect to the embodiment of FIG. 1 the GMSK signals have an eye-pattern such as in the diagram shown in FIG. 3A. Again, the eye-pattern has eye opening portions at every T seconds where the voltage level of the data signals substantially reach one of the high (L1), middle (L2) and low (L3) voltage levels. The timing signal generator 477 generates clock signals as shown in FIG. 3B which are substantially synchronized with the digital signals from the third comparator 479. The timing signals from the timing signals generator 477 coincide with the rise times of the clock signals and substantially with the times of the presence of the eye-open (peak) portion, as seen in FIG. 3A and 3B. As a consequence, the discrimination circuit 475, in response to the timing signals, can effectively discriminates among the high, intermediate and low level voltages of the compensated data signals because the compensated data signals at the receiving side should be adjacent one of the high intermediate and low level voltages. The timing signal generator 477 also generates a sampling pulse at a certain interval of time t after each timing signal is generated, as shown in FIG. 3C, wherein the time interval t is set so as to substantially coincide with the time at which discrimination among the high, intermediate and low level voltages is completed by the discriminating circuit 475. The discrimination circuit 475 selectively applies a sampling pulse to the first sample and hold circuit 420 upon outputting by the generator 460 of a first detection signal, i.e., detecting a high level voltage, or to the second sample and hold circuit 430 upon outputting by generator 460 of a third detection signal i.e. detecting a low level voltage. The discrimination circuit 475 applied the sampling pulse to neither the first or second switches upon outputting by the generator 160 of a the second detection signal i.e. detecting the intermediate level voltage.

A logical circuit 480 receives the first, second and third detection signals from the discrimination circuit 475 and successively outputs either a first digital logic signal designating "1" or a second digital logic signal designating "0". The logical circuit 480 can be of the same type as the logical circuit 180 described above with respect to the embodiment of FIG. 1.

The compensation voltage generating means 490 has a quantization level selection circuit 491 (hereinafter referred to as "the selection circuit") and a low-pass filter 492, and receives the first, second and third detection signals from the discrimination circuit 475. The selection circuit 491 has first, second and third selection terminal 491a, 491b, and 491c. The first selection terminal 491a is connected with an output terminal of an average voltage output circuit 493 having two input terminal two equal resistance valued resistors 493a and 493c and an inversion amplifier (gain of −1). One of the two input terminals is connected to the first connecting point 443 and the output terminal through a first resistor 493a, and the other input terminal is connected to the second connecting point 453, and to the output terminal through the inversion amplifier 493b and the second resistor 493c. As a consequence, the average voltage output circuit 493 can output an average voltage substantially corresponding to an average of an absolute value of the first output voltage from the first sample and hold circuit 420 and an absolute value of the second output voltage from the second sample and hold circuit 430. The first selection terminal 491a receives the average voltage from the average voltage output circuit 493, while the second selection terminal 491b is also connected to the average voltage output circuit 493 through an inversion amplifier 494 (having a gain of = −1) and receives an inversion voltage of the average voltage, and the third selection terminal 491c is grounded.

The selection circuit 491, in response to the output of the discrimination circuit 475, selectively applies one of the average voltage, the inversion voltage and the ground potential, as a corresponding quantized voltage to the input terminal of the low-pass filter 492. The average voltage from the first selection terminal 491a is applied to the low-pass filter 492 upon receiving the first detection signal from the discrimination circuit 475 at the selection circuit 491. Similarly, the inversion voltage of the average voltage from the second selection terminal 491b is applied upon receiving the third detection signal, while the ground potential is applied upon receiving the second detection signal.

The low-pass filter 492 successively receives one of the quantized voltages from the selection circuit 491 and outputs the reference voltage through a conventional voltage follower operational amplifier 499. The cut-off frequency of the low-pass filter 492 is set so as to be identical to the preselected cut-off frequency of the high-pass filter 413.

Referring to FIG. 7A and 7B, there are illustrated examplary waveforms passing through the digital radio transmission system according to the second embodiment of present invention. FIG. 7A shows a first waveform 701 of the data signals which vary among high (L1), intermediate (L2) and low (L3) level voltages, at the transmitting side of the system. A second waveform 703 of the received data signals, outputted from the high-pass filter 413 at the receiving side is also shown in FIG. 7A. The D.C. components of the first waveform 701 is cut off by the transmission line and mainly the high-pass filter 413, and this waveform is, therefore, changed to the second waveform 703 or the like. A third waveform 705 in FIG. 7A merely represents the variation of the center level of the output of the high-pass filter 413. A fourth waveform 707, shown in FIG. 7A, represents an inversion of the third wavefore 705. A fifth waveform 709, shown in FIG. 7B, represent the output of the selection circuit 591 which varies among the average voltage, the ground potential and the inversion of the average voltage. A sixth waveform 711 represents the variation of the compensation voltage output from the low-pass filter 492. As seen in FIG. 7A and 7B, the variation of the sixth waveform 711 follows that of the fourth waveform 707, i.e., the inversion of the variation of the center level of the output of the high-pass filter 413, and further, always prevents the output of the summing circuit 417 from diverging includes compensation. Therefore, the compensated data signals from the summing circuit 417 for the less of the D.C. components of the data signals present at the transmitting side but which have been cut off during the transmission and reception thereof, and substantially reproduces the data signals at the transmitting side, because the summing circuit 417 successively adds the variation of the sixth waveform onto the data signals received at the receiving side so as to reproduce the data signals having the D.C. components.

As a consequence, the discrimination voltage generator 400 can therefore generate the first and second discrimination signals which are respectively adaptive to the variation of the received data signals at the receiving side because both of the first and second discrimination voltages respectively follow the sum of the second waveform i.e. the variation of the received data signals and the fifth waveform 705, i.e., the variation of the compensation voltage.

The present disclosure relates to the subject matter disclosed in Japanese Patent Applications Nos. 1988 (Showa 63)-061914 and 1988(Showa 63)-061915 both filed on March 17, 1988, the entire disclosure of which is in corporated by references.

It will be understood that the above description of the present invention is susceptible to various modifications, changes, and adaptations, and the same are intended to be comprehended within the meaning and range of equivalents of the appended claims. For example, the high-pass filter in both the first and second embodiments is not necessary, provided that the cut-off frequency of the low-pass filter can be substantially identical to that of the transmission line.

What is claimed is:

1. An adaptive signal discrimination circuit for discriminating high and low levels of data signals, comprising:

means for generating a reference signal having a reference level;

means for receiving data signals having values which vary between high and low levels;

a first sampling means for sampling the data signals at first discrete times and outputting a first sample signal having a level indicative of the level of the data signals at the first discrete time;

a second means for sampling the data signals at second discrete times and outputting a second sample signal having a level indicative of the level of the data signals at the second discrete time;

means for generating a discrimination signal having a discrimination level which varies in proportion to the reference level;

means for generating timing signals;

means, responsive to each of the timing signals for discriminating between the high and low levels of the data signals in relation to the discrimination level of the discrimination signal, the first discrete times substantially coinciding with the times of detecting the high level, the second discrete time substantially coinciding with the times of detecting the low level; and means for generating an average signal having a value indicative of an average of an absolute value of the level of the first sample signal and that of the second sample signal, and for generating an inversion signal having a value indicative of the inversion of the value of the average signal;

the reference signal generating means including a low-pass filter having input and output terminals and further including means for selectively applying one of the average signal and the inversion signal to said low-pass filter, said applying means applying the average signal to the input terminal of said low-pass filter when said discriminating means detects the low level of the data signal, said applying means applying the inversion signal to the input terminal of said low-pass filter when said discriminating means detects the high level of the data signal, the reference signal being generated from the output terminal of the said low-pass filter, whereby the discrimination signal adapts to variations of the data signals.

2. The circuit according to claim 1, wherein the discrimination signal is produced from the first, second and reference signals.

3. The circuit according to claim 1, wherein said discrimination signal generating means generates first and second discrimination signals, the first discrimination signal having a level intermediate of the level of the first sample signal and the reference signal the second discrimination signal having a level intermediate of the level of the reference signal and second sample signal.

4. The circuit according to claim 3, wherein the level of the first discrimination signal is substantially at the midpoint of the first sample signal and the reference signal and the level of the second discrimination signal is substantially at the midpoint of the levels of the reference signal and second sample signal.

5. The circuit according to claim 3, wherein said discriminating means further detects an intermediate level of the data signals, the intermediate level being intermediate of the levels of the first and second discrimination signals, the high level being above the levels of the first discrimination signal, the low level being below the level of the second discrimination signal.

6. The circuit according to claim 5, wherein said applying means connects the input terminal of said low-pass filter to a ground potential when said discriminating means detects the intermediate level.

7. The circuit according to claim 1, wherein said timing signal generating means includes means for comparing the data signals with the reference signals and for the data signals substantially varying in accordance with a predetermined eye-pattern having eye opening portions at third discrete times, produces the timing signals so as to coincide with every third discrete time of said eye opening portion.

8. The circuit according to claim 7, wherein said timing signal generating means generates a respective sampling pulse at a certain time interval after each timing signal is generated.

9. The circuit according to claim 8, wherein said certain time interval substantially coincides with an interval of time during which discrimination between the high and low level is completed by said discriminating means.

10. The circuit according to claim 9, wherein said discriminating means comprises means for selectively applying the sampling pulse to said first sampling means upon detecting the high level and to said second sampling means upon detecting the low level and wherein said first and second sampling means are respectively responsive to receipt of the sampling pulse to perform said sampling of the data signals.

11. The circuit according to claim 1, wherein said first sampling means includes first holding means for holding first difference signals having respective levels successively indicative of the difference between the level of the data signal and the level of the reference signal at the first discrete times and wherein said second sampling means includes second holding means for holding second difference signals having respective levels successively indicative of the difference between the level of the data signal and the level of the reference signal at the second discrete times.

12. The circuit according to claim 11, wherein
said data signals, reference signals and first and second difference signals are voltages, said first and second sampling means respectively have resistance, and said first and second holding means respectively have capacitance which hold the voltages of the first and second difference signals;
the first difference signal is successively renewed at each of the first discrete times so that the voltage of the first difference signals at the time of being renewed is intermediate of the voltage of the first difference signals prior to being renewed and a value indicative of the difference between the voltage of the data signal and the voltage of the reference signal at the time of the first difference signal being renewed;
the second signal is successively renewed at each of the second discrete times so that the voltage of the second difference signal at the time of being renewed is intermediate of the voltage of second difference signal prior to being renewed and a value indicative of the difference between the voltage of the data signals and the voltage of the reference signal, at the time of the second difference signal being renewed;
the level of the first sample signal is substantially equal to the sum of the voltage of the first difference signal and the voltage of the reference signal; and
the level of the second sample is substantially equal to the sum of the voltage of the reference signal and the voltage of the second difference signal.

13. The circuit according to claim 1, wherein said low-pass filter has a first cut-off frequency equal to a cut-off frequency of through a transmission line.

14. The circuit according to claim 1, wherein said receiving means has a high-pass filter which transmits the data signals therethrough, said high-pass filter having a second cut-off frequency, and wherein said low-pass filter has a cut-off frequency equal to said second cut-off.

15. The circuit according to claim 14, wherein the second cut-off frequency is higher than a first cut-off frequency of a transmission line through which said receiving means the data signals.

16. A method for discriminating high and low levels of transmitted comprising the steps of:
generating a reference signal having a reference level;
receiving data signals having values which vary between high and low levels;
sampling the data signals at first discrete times;
outputting, following each successive sampling at the first discrete times, a first sample signal having a level indicative of the level of the data signals at the first discrete times;
sampling the data signals at second discrete times;
outputting, following each successive sampling at the second discrete times, a second sample signal having a level indicative of the level of the data signals at the second discrete times;
generating a discrimination signal having a discrimination level which varies is proportion to the reference level;
generating timing signals;
discriminating, in response to each of the timing signals, between the high and low levels of the data signals in relation to the discrimination level of the discrimination signal, the first discrete times substantially coinciding with the times of detecting the high level during said step of discriminating, the second discrete times substantially coinciding with the times of detecting the low level during said step of discriminating;
generating an average signal having a value indicative of to an average of an absolute value of the level of the first sample signal and that of the second sample signal upon detecting the low level during said step of discriminating;
generating an inversion signal having a value indicative of the inversion of the average signal upon detecting the high level during said step of discriminating; and
forming a composite signal from the average and inversion signals;
said step of forming a reference signal including the step of filtering the composite signal so as to reduce relatively high frequency portions thereof and pass the relatively low frequency portions as the reference signal.

17. The method according to claim 16, wherein said step of generating the discrimination signal includes generating the discrimination signal from the first sample signal, the second sample signal and the reference signal.

18. The method according to claim 16, wherein said step of generating the discriminating signal includes generating a first discrimination signal with a first discrimination level intermediate of the level of the first sample signal and the level of the reference signal and generating a second discrimination signal with a second discrimination level intermediate of the level of the reference signal and the level of the second sample signal.

19. The method according to claim 18, wherein the first discrimination signal has a level which is substantially at the midpoint of the respective levels of the first sample signal and the level of the reference signal and the second discrimination signal has a level which is substantially at the midpoint of the respective levels of the reference signal and the second sample signal.

20. The method according to claim 18, wherein said step of discriminating further comprises the step of detecting an intermediate level of the data signals, intermediate of the first and second discrimination levels, the high level being above the first discrimination level, the low level being below the second discrimination level.

21. The method according to claim 20, further comprising the step of equating the composite signal to a ground potential upon detecting the intermediate level during said step of discriminating.

22. The method according to claim 16, further comprising the step of receiving data signals which vary substantially in accordance with a predetermined eye-pattern having eye opening portions at third discrete times, wherein said step of generating the timing signals comprises generating the timing signals so as to coincide with the third discrete times of the eye opening portions.

23. An adaptive discrimination circuit for discriminating high and low levels of transmitted data signals, comprising:
  means for receiving the transmitted data signals which vary between high and low levels;
  means for generating a compensation signal having a compensation level;
  means for producing a compensated data signal having a level indicative of a sum of the level of the transmitted data signal and the compensation level;
  a first sampling means for sampling the compensated data signals at first discrete times and outputting a first sample signal having a level indicative of the level of the compensated data signals at the first discrete times;
  a second sampling means for sampling the compensated data signal at second discrete times and outputting a second sample signal having a level indicative of the level of the compensated data signals at the second discrete times;
  means for generating a discrimination signal having a level intermediate the levels of the first and second sample signals;
  means for generating timing signals;
  means, responsive to each of the timing signals, for discriminating between high and low levels of the compensated data signals in relation to the discrimination level of the discrimination signal, the first discrete times substantially coinciding with the time of detecting the high level, the second discrete times substantially coinciding with the time of detecting the low level; and
  means for generating an average signal having a value indicative of an average of an absolute value of the level of the first sample signal and that of the second sample signal, and for generating an inversion signal having a value indicative of the inversion of the value of the average signal;
  the compensation signal generating means including a low-pass filter having input and output terminals and further including means for selectively applying one of the average signal and the inversion signal to said low-pass filter, said applying means applying the average signal to the input terminal of said low-pass filter when said discriminating means detects the high level of the compensated data signal, said applying means applying the inversion signal to the input terminal of said low-pass filter when said discriminating means detects the low level of the compensated data signal, the compensation signal being generated from the output terminal of said low-pass filter, whereby the discrimination signal adapts to variations of the transmitted data signals.

24. The circuit according to claim 23, wherein said discrimination signal generating means generates first and second discrimination signals, the first dicrimination signal having a level intermediate of the levels of the first sample signal and a ground potential, the second discrimination signal having a level intermediate of the ground potential and the level of the second sample signal.

25. The circuit according to claim 24, wherein the level of the first discrimination signal is substantially at the midpoint of the first sample signal and the ground potential and wherein the level of the second discrimination signal is substantially at the midpoint of the ground potential and the level of the second sample signal.

26. The circuit according to claim 24, wherein said discriminating means further detects an intermediate level of the compensated data signals, the intermediate level being intermediate of the levels of the first and second discrimination signals, the high level being above the level of the first discrimination signal, the low level being below the level of the second discrimination signal.

27. The circuit according to claim 26, wherein said applying means connects the input terminal of said low-pass filter to the ground potential when said discriminating means detects the intermediate level.

28. The circuit according to claim 23, wherein said timing signal generating means includes means for comparing the levels of the compensated data signals with ground potential, and wherein for compensated data signals substantially varying in accordance with a predetermined eye-pattern having eye opening portions at third discrete times, said timing signal generating means produces the timing signals so as to coincide with the respective third discrete times of said eye opening portions.

29. The circuit according to claim 28, wherein said timing signal generating means generates a respective sampling pulse at a certain time interval after each timing signal is generated.

30. The circuit according to claim 29, wherein said certain time interval substantially coincides with an interval of time during which discriminating between the high and low levels is completed by said discriminating means.

31. The circuit according to claim 30, wherein said discriminating means comprises means for selectively applying the sampling pulse to said first sampling means upon detecting the high level and said second sampling means upon detecting the low level and wherein said first and second sampling means are respectively responsive to receipt of the sampling pulse to perform said sampling of the compensated data signals.

32. The circuit according to claim 23, wherein said low-pass filter has a first cut-off frequency equal to a cut-off frequency of a transmission line through which said receiving means receives the transmitted data signals.

33. The circuit according to claim 23, wherein said receiving means has a high-pass filter which transmits the transmitted data signal therethrough, said high-pass filter having a second cut-off frequency, and wherein said low-pass filter has a cut-off frequency equal to said second out-off frequency.

34. The circuit according to claim 33, wherein the second cut-off frequency is higher than a first cut-off frequency of a transmission line through which said receiving means receives the transmitted data signals.

35. A method for discriminating high and low levels of transmitted data signals, comprising the steps of;
receiving transmitted data signals having values which vary between high and low levels;
generating compensation signals having a compensation level;
producing compensated data signals having a level indicative of the sum of the level of the transmitted data signal and the compensation level;
sampling the compensated data signals at first discrete times;
outputting, following each successive sampling at the first discrete times, a first sample signal having a level indicative of the level of the compensated data signals at the first discrete time;
sampling the compensated data signals at second discrete times;
outputting, following each successive sampling at the second discrete times, a second sample signal having a level indicative of the level of the compensated data signals at the second discrete time;
generating a discrimination signal having a level intermediate of the levels of the first and second sample signals;
generating timing signals;
discriminating, in response to each of the timing signals, between the high and low levels of the compensated data signals in relation to the level of the discrimination signal, the first discrete times substantially coinciding with the times of detecting the high level during said step of discriminating, the second discrete times substantially coinciding with the times of detecting the low level during said step of discriminating;
generating an average, signal having a value indicative of an average of an absolute value of the level of the first sample signal and that of the second sample signal upon detecting the high level during said step of discriminating;
generating an inversion signal having a value indicative of the inversion of the average signal upon detecting the low level during said step of discriminating; and
forming a composite signal from the average and inversion signals;
said step of forming a compensation signal including the step of filtering the composite signal so as to reduce relatively high frequency portions and pass the relatively low frequency portions thereof as the compensation signal.

36. The method according to claim 35, wherein said step of generating the discrimination signal includes generating a first discrimination signal with a first discrimination level intermediate of the level of the first sample signal and a ground potential, and generating a second discrimination signal with a second discrimination level intermediate of the ground potential and the level of the second sample signal.

37. The method according to claim 36, wherein the first discrimination signal has a level which is substantially at the midpoint respective of the level of the first sampling signal and the ground potential and wherein the second discrimination signal has a level which is substantially at the midpoint respectively of the ground potential and the level of the second sample signal.

38. The method according to claim 36, wherein said step of discriminating further comprises the step of detecting an intermediate level of the compensated date signals, intermediate of the first and second discrimination levels, the high level being above the first discrimination level, the low level being below the second discrimination level.

39. The method according to claim 38, wherein said method further has a step of equating the composite signal to the ground potential upon detecting the intermediate level during said step of discriminating.

40. The method according to claim 35, further comprising the step of receiving transmitted data signals which vary substantially in accordance with a predetermined eye-pattern having eye opening portions at third discrete times, wherein said step of generating the timing signals comprises generating the timing signals so as to coincide with the third discrete times of the eye opening portions.

* * * * *